(12) United States Patent
DeMassa

(10) Patent No.: US 8,287,765 B2
(45) Date of Patent: Oct. 16, 2012

(54) SYSTEMS AND COMPOSITIONS FOR COLOR STABILIZATION OF POLYMER

(75) Inventor: John DeMassa, Trumbull, CT (US)

(73) Assignee: R.T. Vanderbilt Company, Inc., Norwalk, CT (US)

( * ) Notice: Subject to any disclaimer, the term of this patent is extended or adjusted under 35 U.S.C. 154(b) by 445 days.

(21) Appl. No.: 12/354,902

(22) Filed: Jan. 16, 2009

(65) Prior Publication Data

US 2009/0312465 A1    Dec. 17, 2009

Related U.S. Application Data

(60) Provisional application No. 61/073,262, filed on Jun. 17, 2008.

(51) Int. Cl.
*B60C 9/00* (2006.01)

(52) U.S. Cl. ........ 252/404; 252/406; 524/202; 524/203; 524/291; 524/305

(58) Field of Classification Search .................. 524/191, 524/202, 203, 291, 305; 252/404, 406
See application file for complete search history.

(56) References Cited

U.S. PATENT DOCUMENTS

| | | | |
|---|---|---|---|
| 3,001,969 A | 9/1961 | Tholstrup | |
| 3,376,250 A | 4/1968 | Newland | |
| 3,413,262 A | 11/1968 | Hecker | |
| 3,454,521 A | 7/1969 | Tholstrup et al. | |
| 3,454,523 A | 7/1969 | Tholstrup | |
| 3,537,967 A | 11/1970 | Kelley | |
| 3,700,750 A | 10/1972 | Yamanouchi et al. | |
| 3,856,747 A * | 12/1974 | Dibiasi | 206/568 |
| 4,238,575 A | 12/1980 | Kleiner | |
| 4,464,496 A | 8/1984 | Nemzek | |
| 4,469,909 A | 9/1984 | Chester | |
| 4,575,522 A | 3/1986 | Breach | |
| 4,590,231 A | 5/1986 | Seltzer | |
| 4,797,511 A | 1/1989 | Capolupo | |
| 4,853,154 A | 8/1989 | Icenogle | |
| 5,081,170 A | 1/1992 | Yagi | |
| 5,155,153 A | 10/1992 | Neri | |
| 5,216,056 A | 6/1993 | Suhoza | |
| 5,492,948 A | 2/1996 | Chang | |
| 5,624,982 A | 4/1997 | Chang | |
| 6,015,854 A | 1/2000 | McCullough, Jr. | |
| 6,080,929 A | 6/2000 | Fagouri | |
| 6,277,907 B1 | 8/2001 | Gelbin | |
| 6,362,264 B1 | 3/2002 | Bae | |
| 6,790,888 B2 | 9/2004 | Jancis | |
| 6,806,304 B2 | 10/2004 | Sanders | |
| 6,911,492 B2 | 6/2005 | Keener | |
| 2002/0156165 A1 | 10/2002 | Webster | |
| 2002/0193472 A1 | 12/2002 | Jancis | |
| 2003/0073771 A1 | 4/2003 | Sanders | |
| 2004/0143047 A1 | 7/2004 | Keener et al. | |
| 2006/0058435 A1 | 3/2006 | Szekely | |
| 2007/0027243 A1 | 2/2007 | Wegmann | |
| 2007/0135547 A1 | 6/2007 | Chundury et al. | |
| 2007/0135590 A1 | 6/2007 | Kotani et al. | |

FOREIGN PATENT DOCUMENTS

| | | |
|---|---|---|
| EP | 0206413 A2 | 12/1986 |
| GB | 1081490 | 8/1967 |
| WO | 99/23154 | 5/1999 |
| WO | 99/57190 | 11/1999 |

OTHER PUBLICATIONS

International Search Report, International Searching Authority, mailed Aug. 7, 2009.

* cited by examiner

*Primary Examiner* — Peter D Mulcahy
(74) *Attorney, Agent, or Firm* — Norris McLaughlin & Marcus P.A.

(57) ABSTRACT

Systems and compositions have a three component antioxidant blend for extending color and clarity of a thermoplastic polymer. The antioxidant blend includes a zinc dithiocarbamate, a phenolic and a thioether with a weight ratio range of about 1-2:1-2:1-2. A loading level of the antioxidant blend is from about 0.01 wt. % to about 1 wt. % of the systems and compositions.

8 Claims, 2 Drawing Sheets

SYSTEMS AND COMPOSITIONS FOR COLOR STABILIZATION OF POLYMER

This application claims the benefit of U.S. Provisional Application Ser. No. 61/073,262, filed Jun. 17, 2008.

FIELD OF THE INVENTION

The present disclosure relates to systems and compositions for color stabilization of polymer. More specifically, the present disclosure relates to systems and compositions which include an antioxidant blend for improving color and/or heat stability of the polymer and/or for preventing polymer degradation. The antioxidant blend may extend the color and clarity of a thermoplastic polymer exposed to elevated temperatures for a period of time. The antioxidant blend comprises a three component blend to prevent discoloring of the thermoplastic polymer during exposure to the elevated temperatures for the period of time.

DESCRIPTION OF THE RELATED ART

It is generally known that polymer compositions degrade during preparation of and/or use of the polymer compositions. Stabilizers and oxidation inhibitors are added to the polymer compositions to prevent or reduce degradation of the polymer compositions during the preparation and use of the polymer compositions. Often, combinations of supplementary materials, such as stabilizers and/or oxidation inhibitors, are added to the polymer compositions to protect the compositions from this degradation.

For example, supplementary materials, such as, hindered phenols, organo-metallic compounds, aromatic amines and sulfur compounds are added to compositions to prevent against degradation of the compositions. These supplementary materials added to polymer compositions have traditionally included, for example, benzothiazoles, such as 2-(dialkyl-hydroxybenzyl-thio)benzothiazoles, esters of hydroxybenzyl alcohols, such as benzoates, phthalates, stearates, adipates or acrylates of 3,5-dialkyl-1-hydroxy-benzyl alcohols, stannous phenyl catecholates, zinc dialkyl dithiocarbamates, alkyl phenols, such as 2,6-di-tert-butyl-4-methyl phenol, and dilaurylthio-dipropionate (DLTDP). Typically, about 0.01 percent to about 5.0 percent by weight of one or more supplementary materials is generally added to a polymer composition.

Alternatively, stabilizing systems have been added to polymer and/or polyolefin compositions to prevent oxidative breakdown thereof which include primary antioxidants, secondary antioxidants, metal deactivators, acid acceptors, synergists, anti-static agents, nucleating additives, ultraviolet stabilizers, amines, metals or metal salts, and mineral oils or synthetic hydrocarbon oils. The primary antioxidants include higher molecular weight phenolic-type additives and the secondary antioxidants include phosphorus containing additives, hydroxyl amines, or lower molecular weight phenolic-type additives.

However, use of these stabilizer blends with polymer compositions still often result in substantial discolor or degradation of the polymer compositions either during the preparation of and/or use of the polymer compositions. Thus, these known stabilizers and inhibitors do not effectively suppress oxidation reaction in the polymer compositions, thus leading to discoloration.

Additionally, it is known that a stabilizer blend is added to thermoplastic resins to prevent the thermoplastic resins from degradation caused by contacting metals included in wire and cable applications. The stabilizer blend includes one or more metal dithiocarbamate salts, sterically hindered phenols, 2,2'-oxamidobis{ethyl-3-(3,5-di-t-butyl-4-hydroxyphenyl)propionate}, 1,2-bis(3,5-di-t-butyl-4-hydroxyhydrocinnamoyl) hydrazine, metallic copper, metallic cobalt, and/or metallic manganese.

More specifically, it is known that zinc di-lower alkyldithiocarbamate, such as zinc dibutyldithiocarbamate may be added to a polymer composition to for a thermoplastic heat-stable composition. Antioxidant compositions having aralkyl-substituted diarylamine and sterically hindered phenol have been added to polymer compositions to stabilize the polymer compositions against oxidative degradation.

Other antioxidants that have been typically added to a polymer composition include metal dithiocarbamate salts antioxidant, amine antioxidant, sterically hindered phenolic antioxidant, thiodialkylene bis-(3,5-dialkyl-4-hydroxy)hydrocinnamate antioxidant, a thioether antioxidant, N,N'-alkylene bis-(3,5-dialkyl-4-hydroxy)hydrocinnamamide antioxidant, para-substituted aralkyl-substituted diphenylamine antioxidant, a para-phenylenediamine antioxidant, a polymerized dihydroquinoline antioxidant, a sulfur antioxidant, O,O-dialkyl-3,5-dialkyl-4-hydroxybenzyl phosphonate antioxidant, oxamidobis alkyl (3,5)-dialkyl-4-hydroxyphenyl) propionate antioxidant, N,N'-substituted oxamide antioxidant, or [3-(3,5-dialkyl-4-hydroxyphenyl)propionamido] alkyl stearate antioxidant.

A need, therefore, exists for systems and compositions for color stabilization of polymer. Additionally, a need exists for systems and compositions for color stabilization of polymer which may provide an antioxidant blend to improve color and heat stability of the polymer and/or to prevent degradation of the polymer. Further, a need exists for systems and compositions for color stabilization of polymer which reduces oxidation and discoloring of the polymer during exposure to elevated temperatures for a period of time. Still further, a need exists for systems and compositions for color stabilization of polymer which stabilizes polypropylene throughout a heating period to an elevated temperature of about 150° C.

SUMMARY

Systems and compositions may include a three component antioxidant blend for extending color and clarity of a thermoplastic polymer. The antioxidant blend may have a zinc dithiocarbamate, a phenolic and a thioether with a weight ratio range of about 1-2:1-2:1-2. A loading level of the antioxidant blend may be from about 0.01 wt. % to about 1 wt. % of a total polymer composition.

To this end, in an embodiment of the present invention, an antioxidant additive for stabilization of polymers is provided. The antioxidant may include a zinc dithiocarbamate, a phenolic, and a thioether.

The zinc dithiocarbamate may be, for example, zinc dibutyl dithiocarbamate, zinc diamyldithiocarbamate or piperidinium pentamethylene dithiocarbamate.

The phenolic may be tetrakis[methylene(3,5-di-tert-butyl-4-hydroxyhydrocinnamate)methane, thiodiethylene bis[3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-tert-butyl-4-hydroxyhydrocinnamamide), iso-octyl-3-(3,5-di-tert-butyl-4-hydroxyphenyl)propionate, 2,2'-ethylidenebis(4,6-di-tert-butylphenol), triethylene glycol-bis-3-(3-tert-butyl-4-hydroxy-5-methylphenyl)propionate, tris-(3,5-di-tert-butylhydroxybenzyl)isocyanurate, and 4,4'-thiobis(6-tert-butyl-m-cresol).

The thioether may be distearyl thiodiproprionate, lauryl stearyl thiodipropionate, dilauryl 3,3'-thiodipropionate or pentaerythrityl tetrakis(3-laurylthiopropionate).

The phenolic:thioether:zinc dithiocarbamate blend may have a weight ratio range of about 1-2:1-2:1-2.

In a preferred embodiment, the phenolic:thioether:zinc dithiocarbamate blend may have a weight ratio of about 1:2:1.

In another embodiment, a polypropylene composition is provided. The polypropylene composition includes the inventive antioxidant additive at about 0.1% to about 1% weight of a total polypropylene composition.

It is, therefore, an advantage of the present disclosure to provide systems and compositions for color stabilization of polymer which may improve color and/or heat stability of the polymer and prevent polymer degradation.

Another advantage of the present disclosure is to provide systems and compositions for color stabilization of polymer which may extend color and clarity of the polymer and prevent discoloring of the polymer during exposure to elevated temperatures for a period of time.

A further advantage of the present disclosure is to provide systems and compositions for color stabilization of polymer which may terminate free radicals in the polymer and reduce thermally induced oxidation of the polymer.

Moreover, an advantage of the present disclosure is to provide systems and compositions for color stabilization of polymer which may provide a ternary antioxidant blend that exhibits greater longevity and color stabilization than conventional binary antioxidant blends.

And, another advantage of the present disclosure is to provide systems and compositions for color stabilization of polymer which may provide a ternary antioxidant blend having a unique synergy when compared to other combinations of antioxidants.

Yet another advantage of the present disclosure is to provide systems and compositions for color stabilization of polymer which may provide a ternary antioxidant blend including a zinc dithiocarbamate, a phenolic and a thioether.

Additional features and advantages of the present disclosure are described in, and will be apparent from, the detailed description of the presently preferred embodiments and from the drawings.

DETAILED DESCRIPTION OF THE INVENTION

Figure 1:
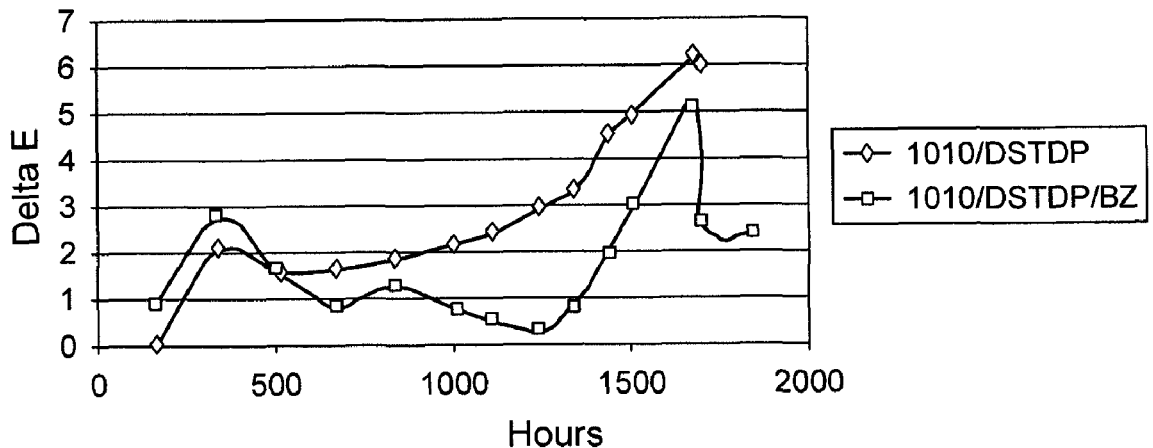
FIG. 1 illustrates a graph of delta E values verses hours for a conventional binary antioxidant blend and a ternary antioxidant blend in accordance with the present disclosure.

The systems and compositions may comprise a ternary antioxidant blend including a zinc dithiocarbamate, a phenolic and a thioether. The antioxidant blend may terminate free radicals in the thermoplastic polymer and/or may reduce thermally induced oxidation of thermoplastic polymers exposed to high temperature applications.

The zinc dithiocarbamate may be zinc dibutyl dithiocarbamate, such as, for example, BUTYL ZIMATE® (hereinafter "BZ") available from R. T. Vanderbilt Company, Inc. of Nowalk, Conn. In other embodiments, the zinc dithiocarbamate may be, for example, zinc diamyldithiocarbamate or piperidinium pentamethylene dithiocarbamate.

The phenolic may be tetrakis[methylene(3,5-di-tert-butyl-4-hydroxyhydrocinnamate)methane, such as IRGANOX® 1010 (hereinafter "1010") available from Ciba Specialty Chemicals Corporation. In other embodiments, the phenolic may be, for example, thiodiethylene bis[3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-tert-butyl-4-hydroxyhydrocinnamamide), iso-octyl-3-(3,5-di-tert-butyl-4-hydroxyphenyl)propionate, 2,2'-ethylidenebis(4,6-di-tert-butylphenol), triethylene glycol-bis-3-(3-tert-butyl-4-hydroxy-5-methylphenyl)propionate, tris-(3,5-di-tert-butylhydroxybenzyl)isocyanurate, and 4,4'-thiobis(6-tert-butyl-m-cresol).

The thioether may be distearyl thiodiproprionate (hereinafter "DSTDP"), lauryl stearyl thiodipropionate (hereinafter "LSTDP"), dilauryl 3,3'-thiodipropionate (hereinafter "LTDP") or pentaerythrityl tetrakis(3-laurylthiopropionate) (hereinafter "PETLTP").

The invention comprises a three component antioxidant blend of zinc dithiocarbamate:phenolic, e.g., thioether 1010: DSTDP:BZ and having a weight ratio range of about 1-2:1-2:1-2. In a preferred embodiment, the weight ratio for the blend may be about 1:2:1. The loading level of the three component antioxidant blend as part of a total polypropylene composition may be from about 0.1 wt. % to about 1 wt. % of the total polypropylene composition.

In embodiments, the three component antioxidant blend may be dry blended and combined for extruding via an extruder. The extrusion of the three component antioxidant blend may be pressed into one or more sheets for heat aging.

While each component is a known antioxidant, the combination represented in the antioxidant blend offers a unique synergy compared with other combinations exemplified in TABLE 1. TABLE 1 illustrates brightimeter color readings (L, a, b) and delta E difference values for antioxidant blends in accordance with the present disclosure. TABLE 2 illustrates brightimeter color readings (L, a, b) and delta E difference values for a conventional binary antioxidant blend and a ternary antioxidant blend in accordance with the present disclosure. TABLE 3 illustrates average delta E differences over intervals for antioxidant blends in accordance with the present disclosure. TABLE 4 illustrates brightimeter color readings (L, a, b) and delta E difference values for ternary antioxidant blends in accordance with the present disclosure.

TABLE 1

| | C3R Irganox 1010 (.4 g) | C4R Irganox 1010 (.2 g) TDBP (.2 g) | C5R Irganox 1010 (.2 g) BZ (.2 g) | C23 Irganox 1010 (.2 g) DSTDP (.231 g) | C25 Irganox 1010 (.127 g) DSTDP (.146 g) BZ (.127 g) |
|---|---|---|---|---|---|
| Unaged | | | | | |
| Brightness | 61.25 | 61.86 | 60.55 | 63.60 | 64.27 |
| L | 80.71 | 81.05 | 80.43 | 81.98 | 82.36 |
| A | .41 | .36 | .49 | .54 | .61 |
| B | 3.78 | 3.80 | 3.18 | 3.42 | 3.42 |
| 24 Hours | | | | | |
| Brightness | 61.01 | 61.19 | 59.91 | 64.02 | 64.60 |
| L | 80.71 | 80.72 | 79.53 | 82.52 | 82.72 |
| A | .16 | .29 | .57 | .18 | −.10 |
| B | 3.84 | 3.50 | 3.37 | 3.75 | 3.48 |
| Delta E | 0.26 | 0.45 | 0.92 | 0.73 | 0.39 |
| 96 Hours | | | | | |
| Brightness | 59.37 | 61.73 | 59.14 | 61.94 | 62.03 |
| L | 79.79 | 81.08 | 79.40 | 81.31 | 80.98 |
| A | .42 | .28 | .40 | .48 | .61 |
| B | 4.19 | 3.73 | 3.83 | 4.01 | 3.51 |
| Delta E | 1.01 | 0.11 | 1.22 | 0.89 | 1.01 |
| 120 Hours | | | | | |
| Brightness | 59.01 | 62.07 | 59.01 | 61.92 | 61.63 |
| L | 79.45 | 81.09 | 79.03 | 81.56 | 80.72 |
| A | .41 | .30 | .64 | .43 | .68 |
| B | 4.06 | 3.60 | 3.51 | 4.24 | 3.48 |
| Delta E | 1.29 | 0.21 | 1.45 | 0.83 | 1.27 |
| 192 Hours | | | | | |
| Brightness | 59.48 | 62.15 | 61.74 | 60.91 | 62.61 |
| L | 79.92 | 81.53 | 80.90 | 80.88 | 81.55 |
| A | .34 | .24 | .68 | .51 | .80 |
| B | 4.36 | 4.05 | 3.60 | 4.45 | 3.45 |
| Delta E | 0.98 | 0.55 | 0.66 | 1.51 | 0.50 |
| 288 Hours | | | | | |
| Brightness | 60.52 | 61.52 | 61.78 | 61.50 | 63.11 |
| L | 80.93 | 81.38 | 81.32 | 81.68 | 81.74 |
| A | .11 | .21 | .15 | .13 | .55 |
| B | 4.56 | 4.64 | 4.27 | 5.18 | 3.86 |
| Delta E | 0.86 | 0.91 | 1.45 | 1.83 | 0.50 |
| 408 Hours | | | | | |
| Brightness | 60.10 | 59.73 | 57.60 | 58.81 | 61.78 |
| L | 80.67 | 80.86 | 78.64 | 80.77 | 80.87 |
| A | −.17 | −.01 | .43 | −.12 | .79 |
| B | 5.02 | 5.58 | 4.43 | 6.19 | 3.69 |
| Delta E | 1.37 | 1.83 | 2.18 | 3.09 | 1.17 |
| 432 Hours | | | | | |
| Brightness | 57.66 | 58.26 | 56.46 | 57.63 | 61.91 |
| L | 79.61 | 79.91 | 78.02 | 79.96 | 80.98 |
| A | .12 | .03 | .21 | −.04 | .52 |
| B | 5.61 | 5.49 | 4.43 | 6.18 | 3.66 |
| Delta E | 2.15 | 2.07 | 2.73 | 3.47 | 1.03 |
| 504 Hours | | | | | |
| Brightness | 56.08 | 57.72 | 58.49 | 56.27 | 62.47 |
| L | 79.12 | 79.93 | 79.70 | 79.75 | 81.47 |
| A | −.40 | −.32 | .23 | −.36 | .42 |
| B | 6.45 | 6.13 | 4.94 | 7.11 | 3.77 |
| Delta E | 3.21 | 2.67 | 1.92 | 4.40 | 0.63 |
| 672 Hours | | | | | |
| Brightness | 54.73 | 58.90 | 59.97 | 53.97 | 62.64 |
| L | 79.03 | 81.18 | 81.22 | 79.36 | 81.72 |
| A | −.56 | −.40 | −.12 | −.64 | .44 |
| B | 7.59 | 6.81 | 5.85 | 8.98 | 4.01 |
| Delta E | 4.28 | 3.11 | 2.85 | 6.26 | 0.65 |
| 696 Hours | | | | | |
| Brightness | 55.15 | 55.49 | 53.96 | 51.38 | 60.09 |
| L | 79.59 | 79.65 | 77.68 | 77.88 | 80.50 |
| A | −.67 | −.67 | −.25 | −.61 | .65 |
| B | 7.96 | 7.71 | 6.46 | 9.07 | 4.70 |
| Delta E | 4.46 | 4.28 | 4.34 | 7.07 | 1.96 |
| 744 Hours | | | | | |
| Brightness | 56.18 | 56.09 | 56.84 | 53.94 | 61.54 |
| L | 79.88 | 80.08 | 79.89 | 79.71 | 81.25 |
| A | −.60 | −.65 | −.15 | −.76 | .37 |
| B | 7.45 | 7.74 | 6.74 | 9.19 | 4.40 |
| Delta E | 3.90 | 4.18 | 3.66 | 6.34 | 1.23 |
| 840 Hours | | Failure | | | |
| Brightness | 55.29 | 56.07 | 4.08 | 51.72 | 60.13 |
| L | 80.21 | 80.28 | 43.30 | 79.36 | 80.61 |
| A | −.85 | −.89 | 18.23 | −.88 | .78 |
| B | 8.74 | 8.13 | 23.78 | 10.86 | 4.62 |
| Delta E | 5.14 | 4.57 | 46.02 | 8.01 | 1.84 |
| 1008 Hours | | Failure | | Failure | |
| Brightness | 52.44 | 25.02 | | 23.38 | 57.24 |
| L | 78.66 | 70.66 | | 75.40 | 79.79 |
| A | −1.05 | 1.87 | | 2.83 | .30 |
| B | 9.25 | 25.65 | | 31.95 | 6.17 |
| Delta E | 6.02 | 24.24 | | 29.37 | 3.53 |
| 1200 Hours | Failure | | | | |
| Brightness | 36.32 | | | | 57.90 |
| L | 80.49 | | | | 80.32 |
| A | −1.12 | | | | .15 |
| B | 25.87 | | | | 6.46 |
| Delta E | 22.14 | | | | 3.49 |
| 1224 Hours | | | | | Failure |
| Brightness | | | | | 55.15 |
| L | | | | | 81.77 |
| A | | | | | −1.50 |
| B | | | | | 10.81 |
| Delta E | | | | | 7.67 |

TABLE 2

| | C23 1010 (.2 g) DSTDP (.231 g) | C33 1010 (.1 g) DSTDP (.2 g) BZ (.1 g) | Delta E difference |
|---|---|---|---|
| Unexposed | | | |
| Brightness | 68.80 | 66.13 | |
| L | 83.67 | 82.55 | |
| a | −.46 | −.48 | |
| b | 1.33 | 2.04 | — |
| 168 Hours | | | |
| Brightness | 65.76 | 64.69 | |
| L | 82.04 | 82.19 | |
| a | −.31 | −.59 | |
| b | 1.72 | 2.83 | |
| Delta E | 1.68 | 0.88 | 0.8 |
| 336 Hours | | | |
| Brightness | 64.90 | 62.34 | |
| L | 81.73 | 79.85 | |
| a | −.36 | −.06 | |
| b | 2.02 | 1.59 | |
| Delta E | 2.06 | 2.77 | −0.71 |

TABLE 2-continued

| | C23 1010 (.2 g) DSTDP (.23 1 g) | C33 1010 (.1 g) DSTDP (.2 g) BZ (.1 g) | Delta E difference |
|---|---|---|---|
| 504 Hours | | | |
| Brightness | 65.64 | 63.91 | |
| L | 82.20 | 80.97 | |
| a | −.35 | −.20 | |
| b | 2.02 | 1.80 | |
| Delta E | 1.63 | 1.62 | 0.01 |
| 672 Hours | | | |
| Brightness | 65.75 | 65.10 | |
| L | 82.15 | 81.76 | |
| a | −.50 | −.34 | |
| b | 1.91 | 1.85 | |
| Delta E | 1.63 | 0.82 | 0.81 |
| 840 Hours | | | |
| Brightness | 65.39 | 64.04 | |
| L | 82.09 | 81.33 | |
| a | −.51 | −.44 | |
| b | 2.18 | 2.21 | |
| Delta E | 1.79 | 1.23 | 0.56 |
| 1008 Hrs. | | | |
| Brightness | 64.72 | 65.12 | |
| L | 82.00 | 81.81 | |
| a | −.64 | −.39 | |
| b | 2.64 | 1.94 | |
| Delta E | 2.13 | 0.75 | 1.38 |
| 1104 Hours | | | |
| Brightness | 63.62 | 61.42 | |
| L | 81.61 | 80.00 | |
| A. | −.75 | −.33 | |
| B | 3.01 | 2.65 | |
| Delta E | 2.34 | 0.49 | 1.85 |
| 1248 Hrs | | | |
| Brightness | 63.44 | 65.81 | |
| L | 81.82 | 82.30 | |
| a | −.92 | −.50 | |
| b | 3.53 | 2.05 | |
| Delta E | 2.91 | 0.25 | 2.66 |
| 1344 Hrs. | | | |
| Brightness | 62.61 | 63.15 | |
| L | 81.47 | 80.91 | |
| a | −.95 | −.45 | |
| b | 3.79 | 2.43 | |
| Delta E | 3.34 | 0.83 | 2.51 |
| 1440 Hrs. | | | |
| Brightness | 60.71 | 60.70 | |
| L | 80.99 | 80.10 | |
| a | −1.28 | −.70 | |
| b | 4.84 | 3.47 | |
| Delta E | 4.49 | 1.93 | 2.56 |
| 1512 Hrs. | | | |
| Brightness | 60.77 | 60.50 | |
| L | 81.55 | 80.02 | |
| a | −1.46 | −.79 | |
| b | 5.61 | 3.57 | |
| Delta E | 4.88 | 2.97 | 1.91 |
| 1680 Hrs. | | | |
| Brightness | 57.45 | 56.79 | |
| L | 79.50 | 79.21 | |
| a | −1.65 | −1.18 | |
| b | 5.75 | 5.86 | |
| Delta E | 6.19 | 5.12 | 1.07 |
| 1738 Hrs. / 1696 | | | |
| Brightness | 58.88 | 62.04 | |
| L | 81.06 | 81.36 | |
| a | −1.64 | −1.01 | |
| b | 6.53 | 4.15 | |
| Delta E | 5.94 | 2.48 | 3.46 |
| 1848 Hrs | | | |
| Brightness | | 62.45 | |
| L | | 81.60 | |
| a | | −.95 | |
| b | | 4.09 | |
| Delta E | | 2.31 | |
| 2040 Hrs | | | |
| Brightness | | 47.22 | |
| L | | 81.13 | |
| a | | −2.73 | |
| b | | 16.97 | |
| Delta E | | 15.17 | |

TABLE 3

| Entry | Approximate Cumulative Hours | Average delta E difference |
|---|---|---|
| 1 | 0–1000 | 0.23 |
| 2 | 1000–2000 | 2.20 |

TABLE 4

| 150 C. Brightimeter Color Readings (L, a, b) | C32 1010 (.2 g) DSTDP (.1 g) BZ (.1 g) | C33 1010 (.1 g) DSTDP (.2 g) BZ (.1 g) | C34 1010 (.1 g) DSTDP (.1 g) BZ (.2 g) | C35 1010 (.133 g) DSTDP (.133 g) BZ (.133 g) |
|---|---|---|---|---|
| Unexposed | | | | |
| Brightness | 59.34 | 66.13 | 60.83 | 61.30 |
| L | 79.53 | 82.55 | 80.35 | 80.31 |
| a | .59 | −.48 | .40 | .72 |
| b | 4.09 | 2.04 | 3.68 | 3.46 |
| 168 Hours | 1.41 | | 2.34 | 1.94 |
| Brightness | 57.56 | 64.69 | 58.30 | 57.68 |
| L | 78.15 | 82.19 | 78.22 | 78.40 |
| a | .34 | −.59 | 1.07 | .72 |
| b | 3.94 | 2.83 | 2.97 | 3.79 |
| Delta E | 1.41 | 0.88 | 2.34 | 1.94 |
| 336 Hours | | | | |
| Brightness | 59.97 | 62.34 | 58.59 | 58.11 |
| L | 78.55 | 79.85 | 78.57 | 78.39 |
| a | −1.27 | −.06 | .60 | 1.00 |
| b | 5.01 | 1.59 | 3.14 | 3.18 |
| Delta E | 2.29 | 2.77 | 1.87 | 1.96 |
| 504 Hours | | | | |
| Brightness | 56.91 | 63.91 | 57.89 | 56.74 |
| L | 77.95 | 80.97 | 77.51 | 77.48 |
| a | .70 | −.20 | 1.35 | .72 |
| b | 4.12 | 1.80 | 3.34 | 3.18 |
| Delta E | 1.58 | 1.62 | 3.01 | 2.84 |
| 672 Hours | | | | |
| Brightness | 58.90 | 65.10 | 57.60 | 54.74 |
| L | 79.60 | 81.76 | 78.02 | 76.06 |
| a | −.00 | −.34 | .85 | 1.06 |
| b | 4.54 | 1.85 | 3.55 | 3.22 |
| Delta E | 0.75 | 0.82 | 2.38 | 4.27 |

TABLE 4-continued

| | C32<br>1010<br>(.2 g)<br>DSTDP<br>(.1 g)<br>BZ<br>(.1 g) | C33<br>1010<br>(.1 g)<br>DSTDP<br>(.2 g)<br>BZ<br>(.1 g) | C34<br>1010<br>(.1 g)<br>DSTDP<br>(.1 g)<br>BZ<br>(.2 g) | C35<br>1010<br>(.133 g)<br>DSTDP<br>(.133 g)<br>BZ<br>(.133 g) |
|---|---|---|---|---|
| 150 C. Brightimeter Color Readings (L, a, b) | | | | |
| 840 Hours | | | | |
| Brightness | 53.70 | 64.04 | 57.01 | 56.24 |
| L | 77.10 | 81.33 | 77.93 | 77.09 |
| a | .12 | −.44 | .76 | .76 |
| b | 3.42 | 2.21 | 3.95 | 3.49 |
| Delta E | 2.56 | 1.23 | 2.46 | 3.22 |
| 1008 Hrs. | | | | |
| Brightness | 56.86 | 65.12 | 54.72 | 57.34 |
| L | 78.59 | 81.81 | 76.13 | 78.12 |
| a | .35 | −.39 | .98 | .79 |
| b | 5.59 | 1.94 | 3.55 | 3.74 |
| Delta E | 1.79 | 0.75 | 4.26 | 2.21 |
| 1104 Hours | | | | |
| Brightness | 54.54 | 61.42 | 57.15 | 57.65 |
| L | 77.08 | 80.00 | 78.30 | 78.41 |
| A | .88 | −.33 | .61 | .75 |
| B | 5.73 | 2.65 | 3.08 | 4.06 |
| Delta E | 2.96 | 0.49 | 2.15 | 1.99 |
| 1248 Hrs. | | | | |
| Brightness | 54.24 | 65.81 | 57.13 | 55.98 |
| L | 77.49 | 82.30 | 78.18 | 77.59 |
| a | −.27 | −.50 | .43 | .47 |
| b | 7.10 | 2.05 | 4.17 | 4.31 |
| Delta E | 3.74 | 0.25 | 2.22 | 2.86 |
| 1344 Hrs. | | | | |
| Brightness | 54.44 | 63.15 | 56.82 | 58.47 |
| L | 77.92 | 80.91 | 78.14 | 79.46 |
| a | .05 | −.45 | .27 | .45 |
| b | 6.53 | 2.43 | 4.26 | 4.65 |
| Delta E | 2.97 | 0.83 | 2.29 | 1.49 |
| 1440 Hrs. | | | | |
| Brightness | 54.86 | 60.70 | 57.13 | 54.16 |
| L | 78.30 | 80.10 | 77.95 | 76.99 |
| a | .08 | −.70 | .32 | .53 |
| b | 6.75 | 3.47 | 3.45 | 5.03 |
| Delta E | 2.97 | 1.93 | 2.41 | 3.68 |
| 1512 Hrs. | | | 1360 Hrs | |
| Brightness | 52.89 | 60.50 | | 54.34 |
| L | 77.62 | 80.02 | | 76.96 |
| a | −.92 | −.79 | | .22 |
| b | 7.15 | 3.57 | | 5.27 |
| Delta E | 3.91 | 2.97 | | 3.84 |
| 1680 Hrs. | | | | |
| Brightness | 18.59 | 56.79 | | 55.03 |
| L | 70.27 | 79.21 | | 77.46 |
| a | 6.26 | −1.18 | | −.01 |
| b | 31.33 | 5.86 | | 5.30 |
| Delta E | 29.32<br>(1572 Hrs) | 5.12 | | 3.47 |
| 1738 Hrs. | | | | |
| Brightness | | 62.04 | | 52.82 |
| L | | 81.36 | | 75.78 |
| a | | −1.01 | | .06 |
| b | | 4.15 | | 4.40 |
| Delta E | | 2.48 | | 4.67 |
| 1848 Hrs | | | | |
| Brightness | | 62.45 | | 44.78 |
| L | | 81.60 | | 82.12 |
| a | | −.95 | | −2.46 |
| b | | 4.09 | | 20.29 |
| Delta E | | 2.31 | | 17.22<br>(1836 Hrs) |
| 2040 Hrs | | | | |
| Brightness | | 47.22 | | |
| L | | 81.13 | | |
| a | | −2.73 | | |
| b | | 16.97 | | |
| Delta E | | 15.17 | | |

Delta E values and Brightimeter color readings (L, a, b) collected for compounded [PRESSED GROUND RODS] polypropylene specimens heated in an oven at 150° C. illustrate that the ternary antioxidant blend may stabilize polypropylene throughout the heating period (see TABLE 1). Additionally, use of the ternary blend may provide better color stabilization.

A ternary antioxidant blend 1010/DSTDP/BZ (1/2/1) was compared with a conventional binary antioxidant blend 1010/DSTDP (1/1) (see TABLE 2). The ternary antioxidant blend exhibited both greater longevity (longer endpoint to failure) and color stabilization (lower delta E) than the binary antioxidant blend. As shown in FIG. 1, the ternary antioxidant blend also exhibits lower Delta E values when compared to the conventional binary antioxidant blend over time.

Figure 2:
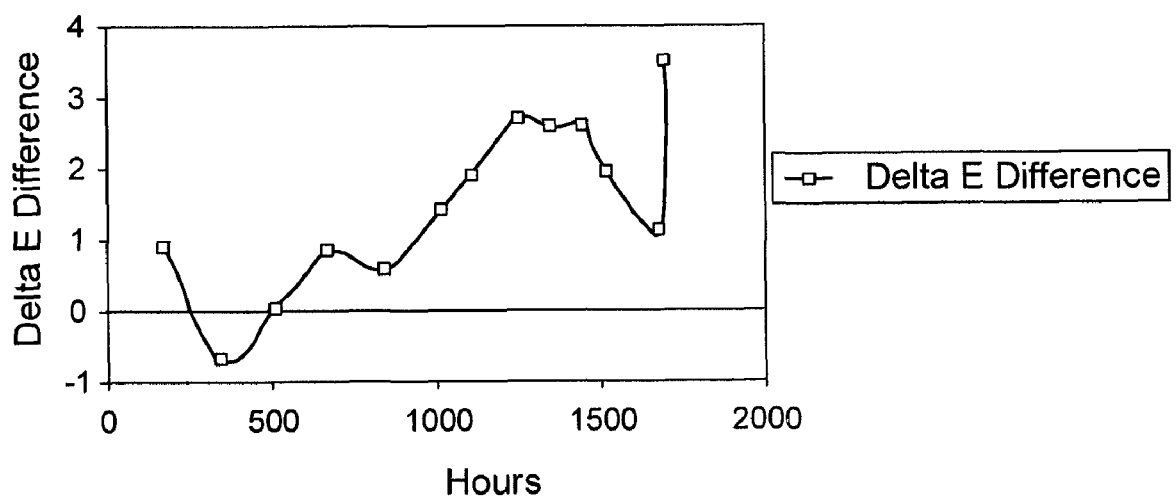
FIG. 2 illustrates a graph of delta E differences verses hours for antioxidant blends in accordance with the present disclosure.

An interesting trend further supports the observation of improved stabilization. If the delta E data for the ternary antioxidant blend is averaged over intervals of the heating period, the binary antioxidant blend degrades more rapidly when compared to the ternary antioxidant blend (see TABLE 3, FIG. 2). In embodiments, under 1,000 hours the two blends perform similarly (having a delta E difference of about 0.23 units) but over 1000 hours to the endpoint of 2000 hours, a ten fold increase in the average delta E difference develops such that the average delta is about 2.2 units.

In other examples, the difference between the two delta E values increases over the heat age period indicating a greater color deterioration for the binary antioxidant blend. If the situation is reversed, graphing would show a negative deflection, which was observed in one measurement, such as at 336 hours with delta E difference of about −0.71 units. However, despite this single measurement, the overall trend showed faster degradation of the standard additive package as evidenced by the positive growing delta difference.

Figure 3:
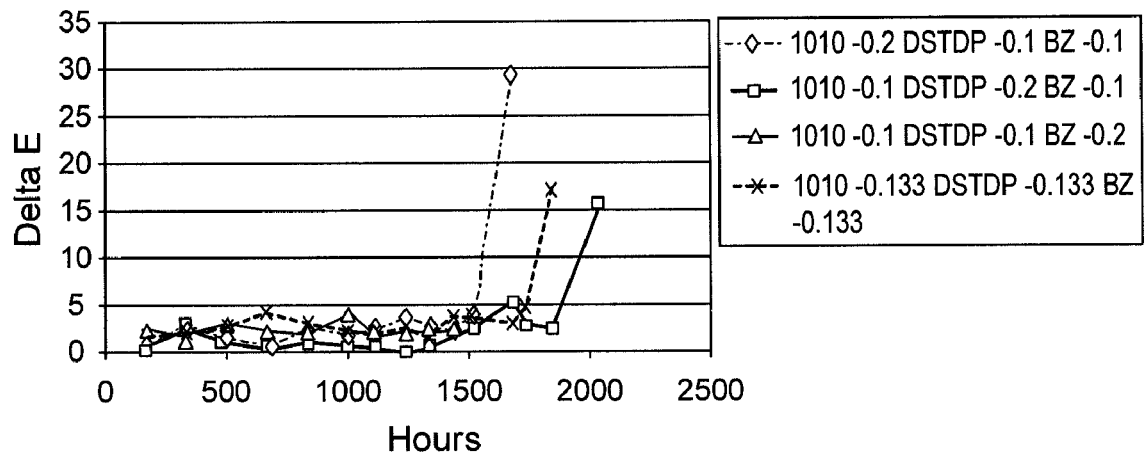
FIG. 3 illustrates a graph of delta E values verses hours for ternary antioxidant blends in accordance with the present disclosure.
Figure 4:
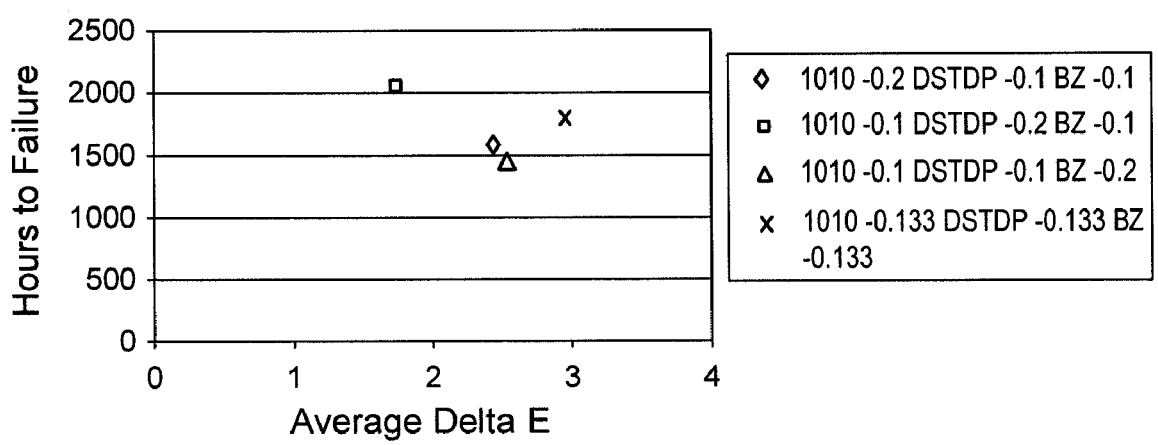
FIG. 4 illustrates a graph of hours to failure values verses average delta E values for ternary antioxidant blends in accordance with the present disclosure.

A series of tests illustrate a performance comparison of various ternary antioxidant component ratios while demonstrating that all within the claimed ratio range provide excellent overall results (see TABLE 4, FIG. 3). To summarize, the results indicate that the C33 blend, which is enriched in DSTDP, performed best in length of protection and maintaining the lowest average delta E and lowest discoloration throughout the runs. The results plotting end point or failure versus average delta E, more easily show the relative performance of each blend (see FIG. 4).

The most desirable or ideal performance profile should preferably exhibit a maximum number of hours to failure and a minimum average delta E value. In embodiments, a preferred blend may be a ternary antioxidant blend included in FIG. 4 which exhibits a low average delta E and a high time to failure, such as the C33 blend enriched in DSTDP.

The ternary antioxidant blend C25 exhibits superior color development suppression in heat exposed polypropylene over the exposure period with longer suppression when compared to competitive blends C3R, C4R, C5R and C23. As a result, the ternary antioxidant blend of the present invention may provide better thermal stability than conventional blends such as single primary antioxidants or blends with conventional secondary antioxidants, as shown is TABLES 1-4 and FIGS. 1-4.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An antioxidant additive for stabilization of polymers comprising:
   (a) an antioxidant fraction consisting of
      tetrakis[methylene(3,5-di-tert-butyl-4-hydroxyhydrocinnamate)methane, and
      distearyl thiodiprionate, and
   (b) a zinc-containing compound, comprising zinc dithiocarbamate, wherein the tetrakis:distearyl thiodiprionate:zinc dithiocarbamate blend has a weight ratio of about 1:2:1.

2. The antioxidant additive according to claim 1, wherein the zinc dithiocarbamate is zinc dibutyl dithiocarbamate.

3. The antioxidant additive according to claim 1, wherein the zinc dithiocarbamate is zinc diamyldithiocarbamate or piperidinium pentamethylene dithiocarbamate.

4. A polymer composition, comprising:
   a polymer package comprising a polypropylene and about 0.1% to about 1% of an additive package comprising
   (a) an antioxidant fraction consisting of
      tetrakis[methylene(3,5-di-tert-butyl-4-hydroxyhydrocinnamate)methane, and
      distearyl thiodiprionate, and
   (b) a zinc-containing compound, comprising zinc dithiocarbamate, wherein the tetrakis:distearyl thiodiprionate:zinc dithiocarbamate blend has a weight ratio of about 1:2:1.

5. The composition according to claim 4, wherein the additive is present at about 0.2%.

6. The composition according to claim 4, wherein the zinc dithiocarbamate is zinc dibutyl dithiocarbamate.

7. The composition according to claim 5, wherein the zinc dithiocarbamate is zinc dibutyl dithiocarbamate.

8. The composition according to claim 4, wherein the polymer package consists essentially of polypropylene.

* * * * *